United States Patent
Morgan et al.

(10) Patent No.: US 7,559,082 B2
(45) Date of Patent: Jul. 7, 2009

(54) METHOD OF ASSISTING AN APPLICATION TO TRAVERSE A FIREWALL

(75) Inventors: Dennis Morgan, Issaquah, WA (US); Alexandru Gavrilescu, Redmond, WA (US); Jonathan L. Burstein, Seattle, WA (US); Art Shelest, Sammamish, WA (US); David LeBlanc, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 765 days.

(21) Appl. No.: 10/603,648

(22) Filed: Jun. 25, 2003

(65) Prior Publication Data

US 2005/0005165 A1    Jan. 6, 2005

(51) Int. Cl.
*H04L 29/06* (2006.01)
(52) U.S. Cl. ......................................................... 726/14
(58) Field of Classification Search ........................ None
See application file for complete search history.

(56) References Cited

U.S. PATENT DOCUMENTS

| | | | | |
|---|---|---|---|---|
| 5,826,014 | A * | 10/1998 | Coley et al. | 726/12 |
| 5,987,611 | A | 11/1999 | Freund | |
| 6,233,688 | B1 * | 5/2001 | Montenegro | 726/11 |
| 6,321,334 | B1 | 11/2001 | Jerger et al. | |
| 6,345,361 | B1 | 2/2002 | Jerger et al. | |
| 6,366,912 | B1 | 4/2002 | Wallent et al. | |
| 6,415,318 | B1 | 7/2002 | Aggarwal et al. | |
| 6,925,495 | B2 * | 8/2005 | Hegde et al. | 709/223 |
| 7,000,006 | B1 * | 2/2006 | Chen | 709/218 |
| 7,146,638 | B2 * | 12/2006 | Malcolm | 726/11 |
| 2003/0131263 | A1 * | 7/2003 | Keane et al. | 713/201 |
| 2003/0188001 | A1 * | 10/2003 | Eisenberg et al. | 709/229 |
| 2004/0128545 | A1 * | 7/2004 | Chakravarty | 713/201 |

OTHER PUBLICATIONS

Check Point Software Technologies, Inc., "Stateful Inspection Technology", Redwood City, CA http://www.checkpoint.com/products/downloads/Stateful_Inspection.pdf (1999).
KaVaDo Inc., "InterDo: Web Application Firewall", New York, NY, 2pgs http://www.liquidlan.com/kavado/InterDo_30_datasheet.pdf.

* cited by examiner

*Primary Examiner*—Gilberto Barron, Jr.
*Assistant Examiner*—Martin Jeriko P San Juan
(74) *Attorney, Agent, or Firm*—Wolf, Greenfield & Sacks, P.C.

(57) ABSTRACT

A method for a firewall-aware application to communicate its expectations to a firewall without requiring the firewall to change its policy or compromise network security. An application API is provided for applications to inform a firewall or firewalls of the application's needs, and a firewall API is provided that informs the firewall or firewalls of the application's needs. An interception module watches for connect and listen attempts by applications and services to the network stack on the local computer. The interception module traps these attempts and determines what user is making the attempt, what application or service is making the attempt, and conducts a firewall policy look-up to determine whether the user and/or application or service are allowed to connect to the network. If so, the interception module may instruct the host and/or edge firewall to configure itself for the connection being requested.

15 Claims, 9 Drawing Sheets

METHOD OF ASSISTING AN APPLICATION TO TRAVERSE A FIREWALL

TECHNICAL FIELD OF THE INVENTION

The present invention is generally related to security on a computer or network, and is more specifically related to firewalls and their use with an application.

BACKGROUND OF THE INVENTION

In general, a firewall is an electronic boundary that prevents unauthorized users from accessing certain files on a network or a computer. A firewall may be provided as firewall code on a user's computer ("host firewall"). Alternatively, a dedicated firewall machine may be provided at the edge of a network ("edge firewall") that interfaces with computers outside the network and has special security precautions built into it in order to protect sensitive files on computers within the network. The idea is to protect a cluster of more loosely administered machines hidden behind the edge firewall from computer users outside of the network. The machine on which the edge firewall is located is often referred to as a "gateway" or a "dedicated gateway." If configured to protect a network from the Internet, the machine is often referred to at an "Internet Gateway Device."

Firewalls use one or more of at least three different methods to control traffic flowing in and out of the network. In a first method, called static packet filtering, packets are analyzed against a set of filters. Packets approved by the filters are sent to the requesting system; all others are discarded. In a second method, called proxy service, information from the Internet is retrieved by the firewall, evaluated against a policy, and then sent to the requesting system, and vice versa. In a third, newer method, called stateful inspection, the contents of the packet are not examined, but instead key parts of the packet are compared to a database of trusted information. Information traveling from inside the firewall to the outside is monitored for special defining characteristics, and then incoming information is compared to these characteristics. If the comparison yields a reasonable match, the information is allowed through. Otherwise it is discarded.

Firewalls are customizable, meaning that filters may be added or removed based upon several conditions. As an example, Internet Protocol ("IP") addresses may be used to restrict or block traffic. As an example, if a certain IP address outside the network is reading too many files from a server, the firewall can block all traffic to and/or from that address. As another example, a firewall may block all access to certain domain names, or allow access to only specific domain names. As still another example, a company might set up a network with only one or two machines to handle a specific protocol or protocols and ban those protocols on all other machines. Still another example is using ports to restrict traffic. For example, if a server machine is running a Web (HTTP) server and an FTP server, the Web server would typically be available on port 80, and the FTP server would be available on port 21. A company might block port 21 access on all machines but one on a network.

Thus, a firewall ensures security by reviewing network communications and only allowing communications that are consistent with a policy that has been set within the firewall. However, while the traffic control methods described above work well for filtering some traffic, the rules or policies set for the firewall may not meet the needs of some of the applications within the network. Since firewalls cannot have complete knowledge of all existing and future applications, firewalls implement heuristics to differentiate between a safe communication and a potentially dangerous communication. For example, a firewall may choose to allow connections initiated from within a trusted network but not from those initiated from outside the trusted network (e.g., initiated from the Internet).

Although the heuristics simplify firewall policy design, some applications do not align with the firewall's heuristics. As a result, attempts at communication by such an application will fail, prompting firewall designers to implement and test special work-arounds for each and every application that fails. These work-arounds increase firewall complexity and code churn.

Recent efforts to devise a firewall control protocol ("FCP") that allows applications to modify a firewall's policy on an ad hoc basis have not been successful due to a fundamental security conflict: The firewall policy is created and managed by a trusted entity (e.g., a network administrator), while the applications may run on untrusted nodes or endpoints. Allowing untrusted applications to modify corporate network policy is inconsistent with the security goals of the firewall.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment of the invention, a method is provided for a firewall-aware application to communicate its expectations to the firewall without requiring the firewall to change its policy or compromise network security. To this end, an application application programming interface ("API") may be provided for applications to inform a firewall or firewalls of the application's needs, describe their current or anticipated activities, and describe handling requirements for the networking data sent or received by an application.

In accordance with another embodiment of the present invention, a firewall API is provided that informs the firewall or firewalls of the application's needs. The application API and the firewall API may interact through a networking subsystem which may be provided, for example, as part of the operating system of a computer system.

In accordance with another embodiment of the invention, an enforcement module is provided to allow a user to create a simple firewall policy, or network access policy, to either allow or deny firewall unaware applications and services on their computer to connect to the network. Additionally, the enforcement module allows these policies to be on a per-user basis. The user does not need to know or use rules for ports, protocols, or IP addresses to enable an application to work through a firewall. To this end, a socket application programming interface is provided which allows the application or service to describe its needs around inbound and outbound restrictions using IP addresses, subnet information, or scope of the connection. The user may also define a communication security level (e.g., authentication and/or encryption).

In accordance with another embodiment of the invention, the enforcement module allows for the transparent traversal of applications through the firewall. The enforcement module includes an interception module that watches for connect and listen attempts by applications and services to the network stack on the local computer. The interception module traps these attempts and determines what user is making the attempt, what application or service is making the attempt, and conducts a firewall policy look-up to determine whether the user and/or application or service are allowed to connect to the network. If so, the interception module may instruct the host and/or edge firewall to configure itself for the connection being requested.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Prior to proceeding with a description of the various embodiments of the invention, a description of a computer and networking environment in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The terms "program" or "module" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
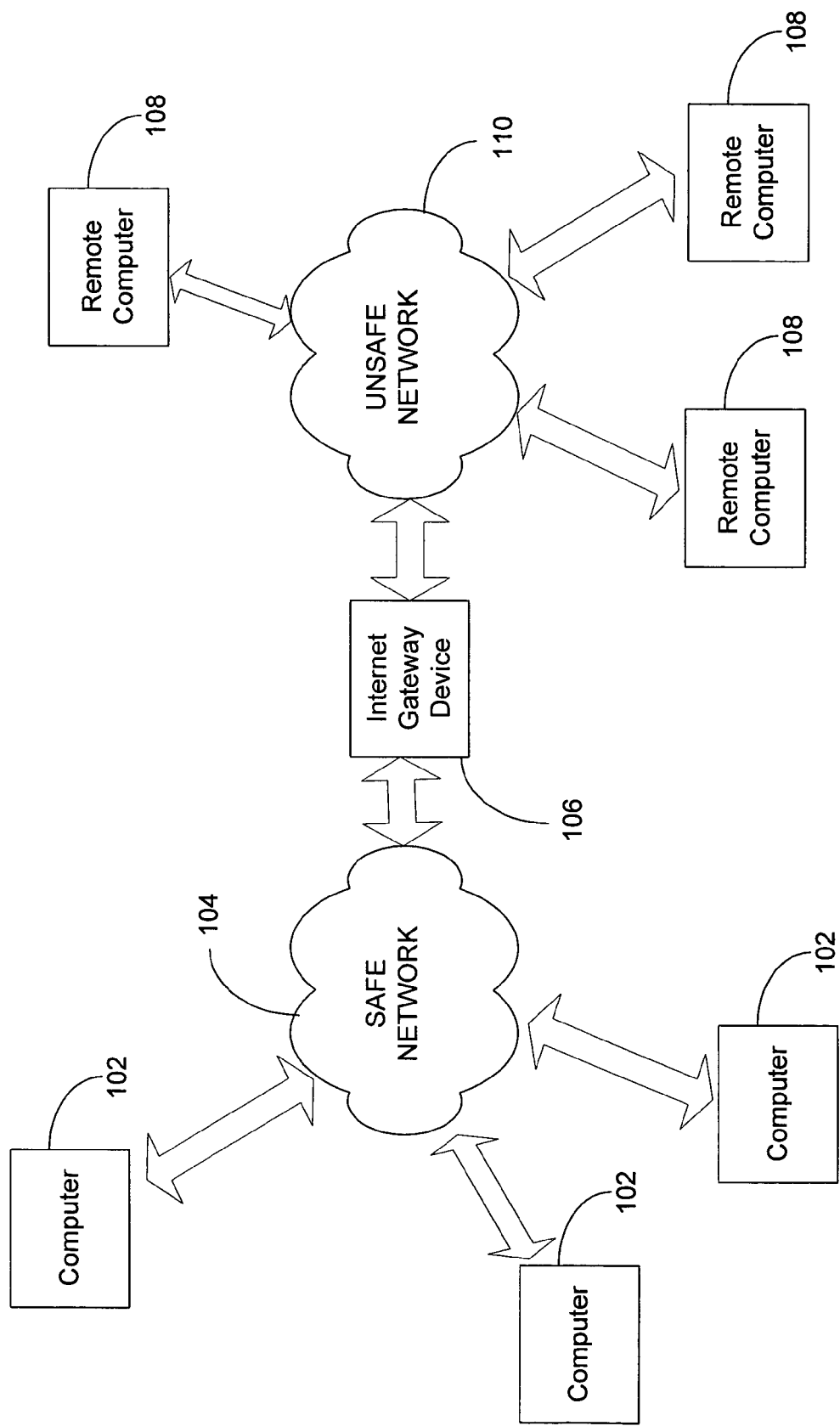
FIG. 1 is a schematic diagram illustrating computers connected by a network.

An example of a computer networking environment suitable for incorporating aspects of the invention is described with reference to FIG. 1. The example computer networking environment includes several computers 102 communicating with one another over a safe network 104, indicated by a cloud. The safe network 104 may include many well-known components, such as routers, gateways, hubs, etc. and allows the computers 102 to communicate via wired and/or wireless media. When interacting with one another over the safe network 104, one or more of the computers 102 may act as clients, servers or peers with respect to other computers 102. Accordingly, the various embodiments of the invention may be practiced on clients, servers, peers or combinations thereof, even though specific examples contained herein may not refer to all of these types of computers.

The safe network 104 in this example is considered a "safe" network, in that the computers 102 are protected by a common firewall, in the example shown as an Internet gateway device 106. The Internet gateway device 106 protects the computers 102 from remote computers 108 located on a public or unsafe network 110, in the example shown by a cloud. Although described as an Internet gateway device 106, the gateway device may protect the safe network from other types of unsafe networks, not necessarily the Internet, including a LAN, a WAN, or another suitable network.

Although shown as having multiple computers, the safe network 104 may include only a single computer 102. In addition, although the unsafe network 110 is shown as having multiple remote computers 108, it may instead have only one.

Figure 2:
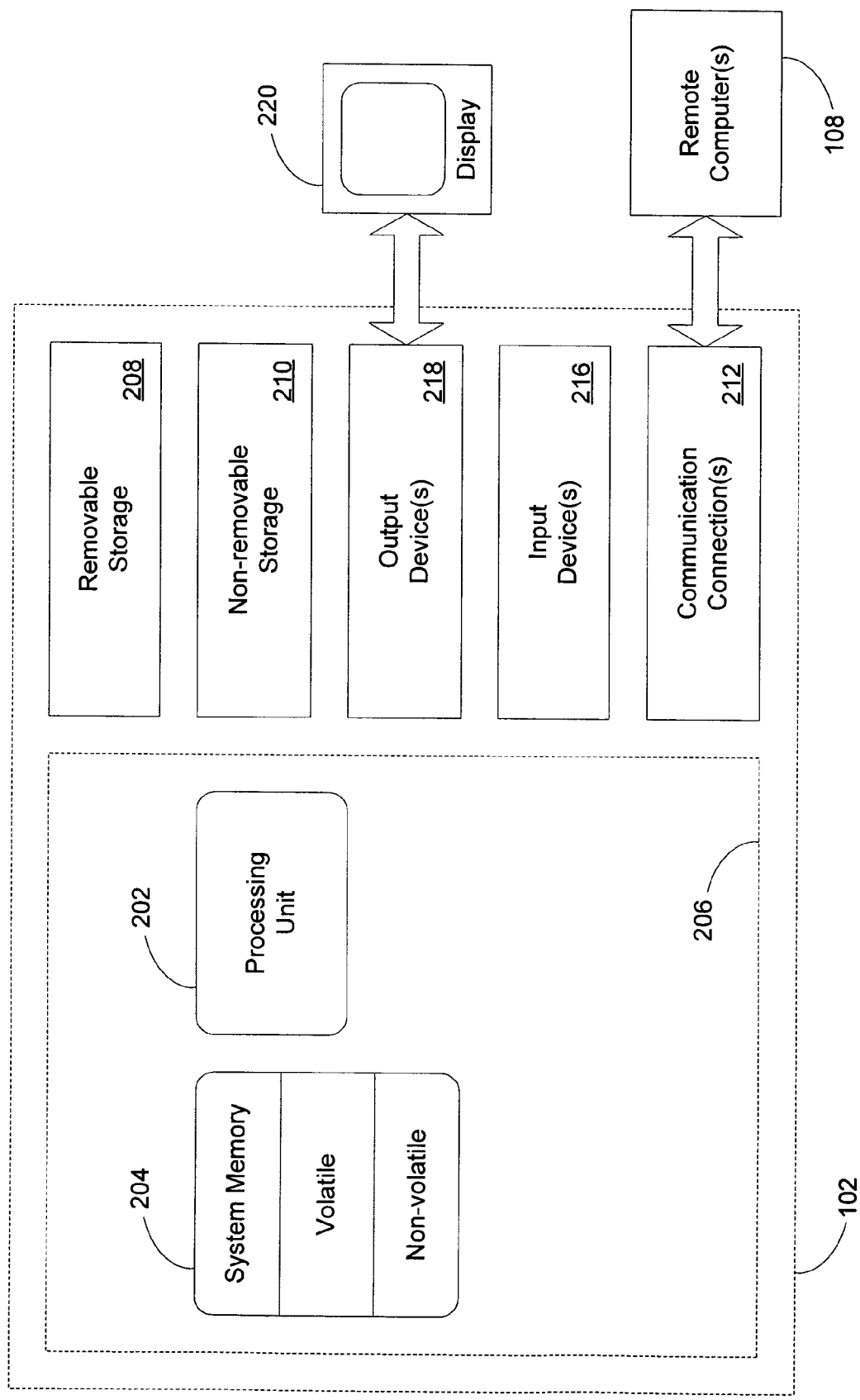
FIG. 2 is a schematic diagram generally illustrating an exemplary computer system usable to implement an embodiment of the invention.

Referring to FIG. 2, an example of a basic configuration for the computer 102 on which embodiments of the invention described herein may be implemented is shown. In its most basic configuration, the computer 102 typically includes at least one processing unit 202 and memory 204. The processing unit 202 executes instructions to carry out tasks in accordance with various embodiments of the invention. In carrying out such tasks, the processing unit 202 may transmit electronic signals to other parts of the computer 102 and to devices outside of the computer 102 to cause some result. Depending on the exact configuration and type of the computer 102, the memory 204 may be volatile (such as RAM), non-volatile (such as ROM or flash memory), or some combination of the two. This most basic configuration is illustrated in FIG. 2 by dashed line 206.

The computer 102 may also have additional features/functionality. For example, the computer 102 may also include additional storage (removable 208 and/or non-removable 210) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 212 that allow the device to communicate with other devices, such as other computers 102 on the safe network 104, or remote computers 108 on the unsafe network 110 (only a remote computer 108 is shown in FIG. 2). A communication connection is an example of a communication medium. Communication media typically embody computer readable instructions, data structures, program modules, or other data in a modulated data signal such as a carrier wave or other transport mechanism and include any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 216 such as a keyboard/keypad, mouse, pen, voice input device, touch input device, etc. Output devices 218 such as a display 220, speakers, a printer, etc. may also be included. These devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer 102 of electrical signals representing data in a structured form. This manipulation transforms the data or maintains it at locations in the memory system of the computer 102, which reconfigures or otherwise alters the operation of the computer 102 in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that several of the acts and operation described hereinafter may also be implemented in hardware.

Figure 3:
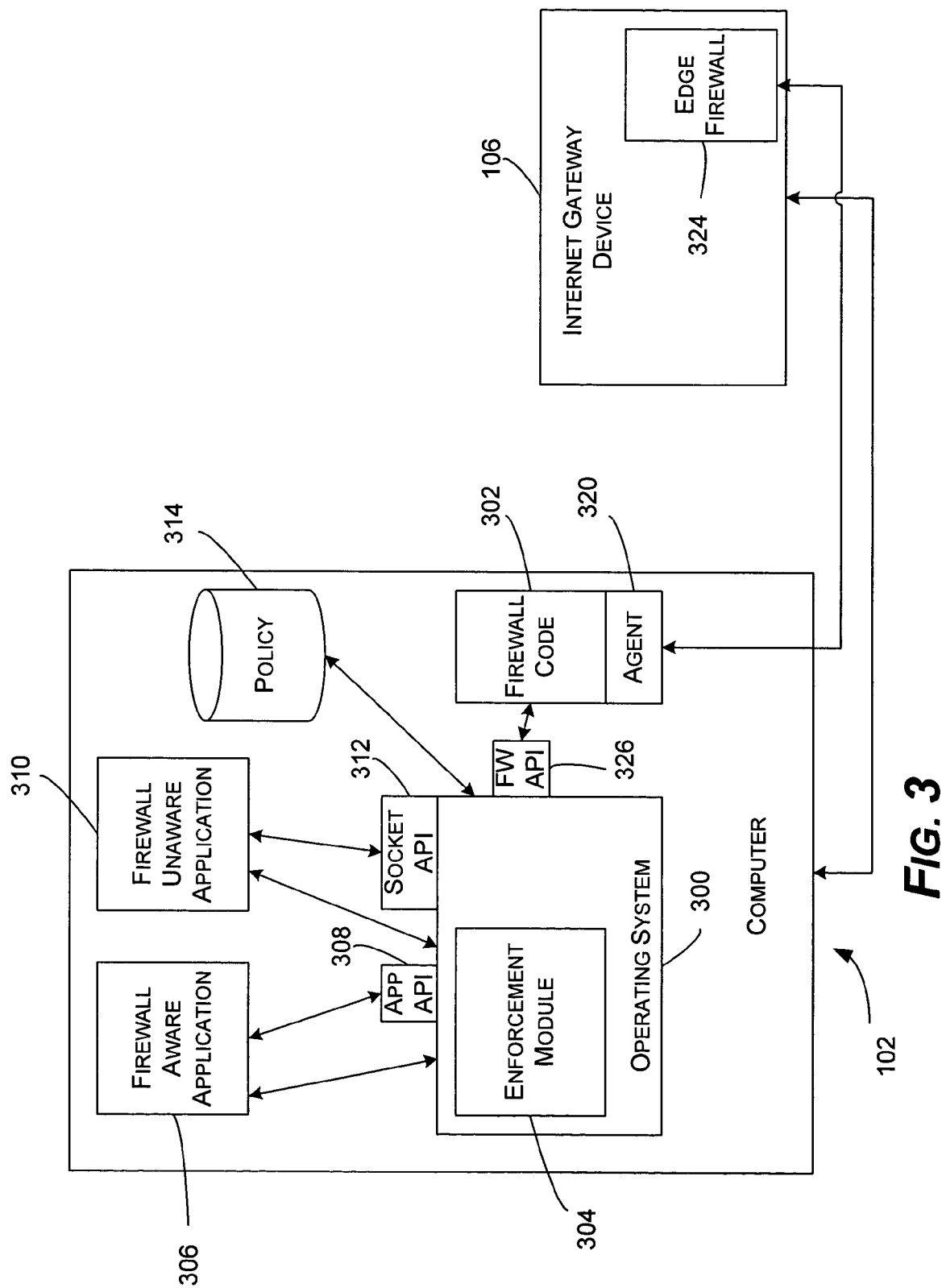
FIG. 3 is a block diagram illustrating details of an architecture for the computer system of FIG. 2 that may be used in accordance with an embodiment of the invention.

FIG. 3 is a block diagram illustrating details of an architecture for the computer 102 that may be used in accordance with an embodiment of the invention. The computer 102 includes an operating system 300 having a host firewall, indicated as firewall code 302, associated therewith. The firewall code 302 may be a component of the operating system 300 or a separate application or program running on the computer 102. In the example shown, the firewall code 302 acts as a host firewall, in that it protects the computer 102 on which it runs.

The computer 102 also includes an enforcement module 304, which is associated with or is an integral part of the operating system 300. The function and features of the enforcement module 304 are described further below.

In accordance with one aspect of the present invention, a firewall aware application 306 may connect to the operating system 300 and/or the enforcement module 304. In addition to direct connections, an application API 308 is provided for the firewall aware application 306 to call upon functions of the enforcement module 304, as further described below.

In accordance with another embodiment of the invention, a firewall unaware application 310 may also connect to the operating system 300 and/or the enforcement module 304. In addition to direct connection to the operating system 300 and/or the enforcement module 304, a socket API 312 is provided for the firewall unaware application 310 to call upon functions of the enforcement module 304, as is also further described below.

Firewall policy 314 is maintained on or is associated with the computer 102 and can be accessed by the operating system 300 and/or the firewall code 302. In the embodiment shown, the firewall policy 314 is shown as a database, but the firewall policy 314 may be maintained in several databases or may be stored in another suitable manner.

An agent 320 may be provided for communicating with the Internet gateway device 106. In addition, the Internet gateway device 106 includes firewall software 324 (hereafter referred to as "edge firewall 324"), which may be implemented so as to protect the safe network 104 from remote computers 108 in a known manner. In addition, in accordance with one aspect of the present invention, a firewall API 326 is provided on the operating system 300 for access by the firewall code 302.

In accordance with one embodiment of the invention, a firewall aware application 306 may request explicit traversal of the firewall code 302 and/or the edge firewall 324 via the application API 308. By "explicit," we mean that the traversal through the firewall code 302 and/or the edge firewall 324 is specifically requested by the firewall aware application 306. As described in the Background section, for prior art network systems, firewalls used heuristics to guess at the intentions of an application. In contrast, for the present invention, application API 308 is provided so that the firewall aware application 306 (or a firewall aware service) may explicitly describe its requirements and communicate its requests to the firewall code 302 and/or the edge firewall 324.

The firewall aware application 306 may request a variety of other services that may be enforceable by the firewall code 302 and/or the edge firewall 324. As one example, the firewall aware application 306 may request a connection with a known endpoint or endpoints outside the safe network 104. The connection may be a single, one time connection or many instances of the same connection may be made. As another example, the firewall aware application 306 may request bandwidth or connection throttling for inbound and/or outgoing connections. As yet another example, the firewall aware application 306 may request that the firewall limit connectivity scope to a subset of interfaces, local or remote addresses. As still another example, the firewall aware application 306 may request that only authenticated clients may connect to a specific port. In another example, the firewall aware application 306 may request that minimum or maximum bandwidth rules be enforced and/or a timeout policy may be requested for specific clients, such as Transmission Control Protocol ("TCP") clients. In addition, the firewall aware application 306 may request that specific protocol options (such as SACK) be turned on or off, with the objective being to reduce the attack surface. As one more example, the firewall aware application 306 may describe the property or properties of a flow that requires special handling, such as a connection with confidential data.

The firewall aware application 306 may communicate its request to the firewall code 302 and/or the edge firewall 324 via the application API 308. The following is a specific example of a structure of a format that may be used for requesting direct communication with a remote computer, such as the remote computer 108, or node:

--- struct sockaddr Target;
... // initialize Target structure with endpoint information
setsockopt( s, SOL_SOCKET, SO_REQUEST_ACCESS, &Target, sizeof(Target) );

In the foregoing example, the request is directed to a particular socket. The socket option name is SOL_SOCKET, SO_REQUEST_ACCESS. The parameter description follows the terms "struct sockaddr Target"; and includes a description of the remote endpoint, or specific remote computer 108. Other data structures may be used to communicate request by the firewall aware application 306.

If desired, the operating system 300 and/or the enforcement module 304 may indicate to the firewall aware application 306 that the request is supported. As such, the operating system 300 and/or the enforcement module 304 may return a value indicating that the request has been accepted and will be forwarded to the firewall, or that the operating system 300 does not implement this particular call. Alternatively, the operating system 300 and/or the enforcement module 304 may return an indication that it is checking the status, and will let the firewall code 302 and/or edge firewall 324 eventually make the decision.

The firewall aware application 306 may make its call to the application API 308 upon installation of the application, upon a request for a connection, or at another suitable time. The request may be made known to the firewall code 302 and/or the edge firewall 324 at the time of the request to the application API 308, at a request for a connection, or at another time. In accordance with one embodiment of the invention, the request is made known to the firewall code 302 and/or the edge firewall 324 upon the firewall aware application's 306 attempt to make a connection. That is, either the firewall aware application 306 attempts to send something through a firewall code 302 and/or the edge firewall 324, or the firewall aware application 306 indicates that it is awaiting communication through one of the firewalls. To this end, the event may generate a callback, such as a generic socket event notification mechanism. The callback may be communicated to the enforcement module 304. An example of a format of such a callback is set forth below:

```
void SocketActivityCallback(
    DWORD       dwProcessID,   // process causing socket event
    SOCKET      sock,          // socket handle
    SOCK_EVENT  event,         // socket event (e.g. bind)
    LPVOID      pDetails,      // socket event parameters
    DWORD       cbDetails      // event parameter size
);
```

For the foregoing callback, the following parameters are present: dwProcessID, which is the ID of the process that initiated the event; sock, which is the handle of the socket for which the event was generated; event, which is the event ID, such as SOCKET_EVENT_BIND; pDetails, which is a pointer to the blob containing the event details, which is event-specific; and cbDetails, which is the event detail blob size. Other data structures or notification mechanisms may be used to inform the enforcement module 304 that the firewall aware application 306 is attempting to establish a connection. As an example of an alternative to callbacks, an input/output (I/O) call may be used.

The callback is invoked immediately after each socket event has occurred. In accordance with one embodiment of the invention, the enforcement module 304 reviews socket events as they happen and maintains the relevant socket state details to enable appropriate communications to the firewall code 302 and/or the edge firewall 324.

The operating system 300 and/or the enforcement module 304 utilizes the firewall API 326 to tell the firewall code 302 that a connection is requested by the firewall aware application 306. The notification may be as described above, and may additionally include application-specific information, such as application trust level, application identification, and so forth. The firewall code 302 compares the request with the firewall policy 314 and may permit or deny the request. An indication to the application may or may not be given.

In addition, in accordance with an embodiment of the present invention, the firewall code 302 notifies the edge firewall 324 that the connection is requested. This information may be transmitted to the edge firewall 324 via an authenticated protocol or via the agent 320. The edge firewall 324 may additionally check the request against its own policy (not shown, but known in the art). Assuming the request meets the policies of both the firewall code 302 and the edge firewall 324 the connection is permitted to pass through the firewalls.

Although described as having both the firewall code 302 and the edge firewall 324, the present invention may be implemented in a system having only one of these firewalls. For example, on a home network having only one computer 102, the only firewall available may be the firewall code 302.

Figure 4:
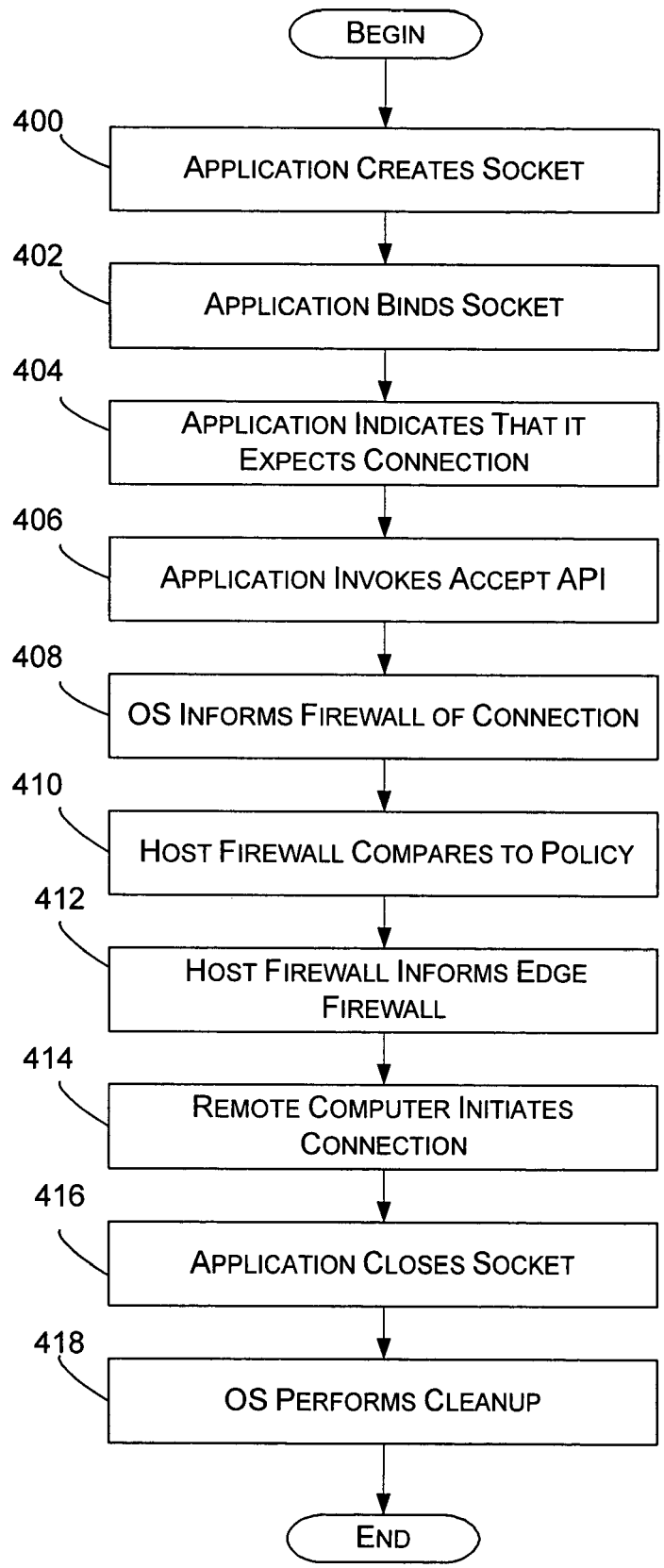
FIG. 4 shows a flow diagram illustrating an example of a process of a firewall aware application requesting that it receive a single connection from a known endpoint such as a remote computer.

FIG. 4 shows an example of a process of the firewall aware application 306 requesting that it receive a single connection (e.g., a TCP connection) from a known endpoint (e.g., one of the remote computers 108).

In step 400, the firewall aware application 306 creates a new socket. At step 402, the firewall aware application 306 binds the socket to receive a connection on a port N. At step 404, the firewall aware application 306 informs the operating system 300 and/or the enforcement module 304 that it expects a connection from a specific address using the application API 308. This may be done, for example, using the format of the call described above. At step 404, the firewall aware application 306 binds the socket to receive the connection on a port N.

At step 406, the firewall aware application 306 invokes an accept API (not shown, but known in the art) and starts waiting for a connection. The firewall aware application 306 invoking the accept API results in a notification being sent, as described above. The operating system 300 now has full knowledge of the firewall aware application's 306 intent and connection endpoint, and at step 408 uses the firewall API 326 to tell the firewall code 302 that a single connection from a designated address is expected to arrive on local port N. The notification may also include application-specific information, such as application trust level, application identification, or other information.

At step 410, the firewall code 302 compares the request by the firewall aware application 306 with the firewall policy 314 and permits or denies the request. At step 412, the firewall code 302 notifies the edge firewall 324 that one connection with well-known properties is expected.

Assuming the request meets the policies of the firewall code 302 and the edge firewall 324 when the remote node initiates connection to the firewall aware application 306 on port N, the communication will be allowed. At step 414, the remote computer 108 establishes the connection.

After the firewall aware application 306 is done with the listening port N, the socket is closed at step 416. The operating system 300 may then perform the clean-up at step 418, for example notifying the firewall code 302, which in turn communicates with the edge firewall 324.

As can be understood from the foregoing, the application API 308 and a firewall API 326 provide mechanisms by which firewall aware application 306 may communicate a request to a host or edge firewall. The firewalls may then react accordingly, and if the request meets firewall policy 314 (and the firewall policy of the edge firewall, if relevant), may allow the connection. As such, the application API 308 and the firewall API 326 provide enhanced assistance for applications for traversal of firewalls, without requiring the writing of separate, application-specific codes for each type of connection.

For the embodiment just described, the enforcement module 304 operates as a component of the operating system 300, or is closely associated therewith, and handles the requests by the firewall aware application 306. If necessary, the enforcement module 304 may provide conversion between abstraction levels of the application API 308 and the firewall API 326. For example, the application API 308 may deal with sockets and connections, whereas the firewall API 326 may deal with ports and flows.

In accordance with another embodiment of the invention, the enforcement module 304 may additionally permit a user to create simple firewall policies or network access policies to either allow or deny applications or services traversal through a firewall. The functions of this aspect of the enforcement module 304 are described below. Although the enforcement module 304 described herein is capable of the functions already described and the further functions described below, separate modules may be provided for the separate functions. In addition, a computer such as the computer 102 may include a module having only one of these sets of functions or a portion of the sets of functions. However, for ease of description, the description herein assumes that the enforcement module 304 is capable of at least both sets of functions described.

Figure 5:
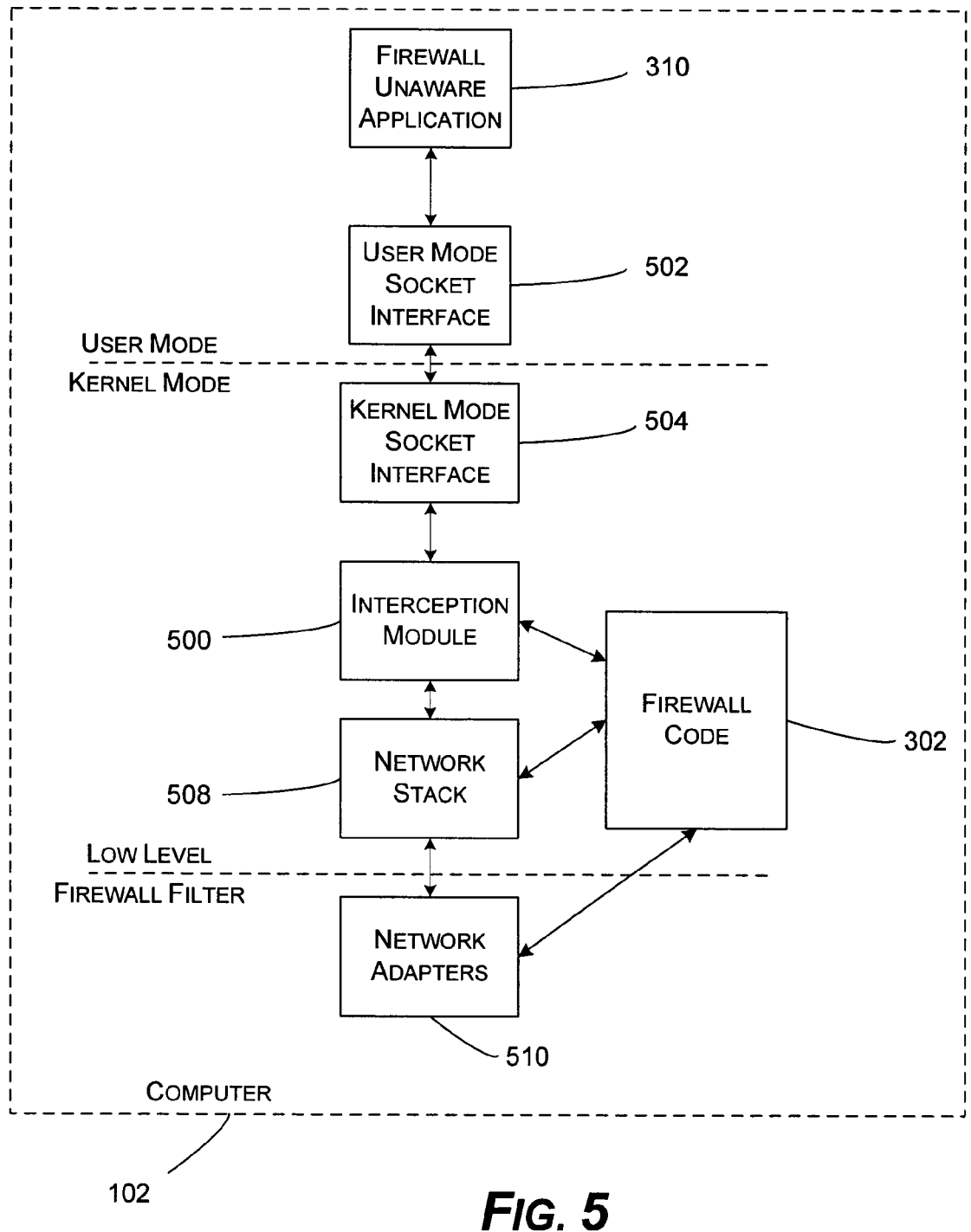
FIG. 5 shows a block diagram generally representing components of the computer system of FIG. 2 and their interaction with an interception module in accordance with an embodiment of the invention.

For the purposes of this description, a portion of the enforcement module 304 that is configured to work with a firewall unaware application 310 will be referred to herein as an interception module 500 (FIG. 5). In general, the interception module 500 is configured to watch for connect and listen attempts by applications and services to a network stack 508 on a local computer, such as the computer 102. The interception module 500 traps these attempts and determines what user is making the attempt, determines what application or service is making the attempt, and does a firewall policy 314 look-up to determine whether the user and application/service are allowed to connect to the network.

FIG. 5 shows a block diagram generally representing some components of the computer 102 and interaction of those components with the interception module 500. The computer 102 includes a user mode socket interface 502 (e.g., user mode Winsock), a kernel mode socket interface 504 (e.g., kernel mode Winsock), and network adapters 510.

Generally, each of the components shown in FIG. 5 exists in some form or another on existing computers, with the exception of the interception module 500. In accordance with one embodiment of the present invention, the interception module 500 is arranged so that it can receive and trap the attempts to connect or listen by applications and services. To this end, the interception module 500 may be located, for example, between the network stack 508 and a firewall unaware application 310, for example at the interface of the network stack 508. As described further below, the interception module 500 extracts the connection needs from the connect and/or listen attempt, determines if the connection needs match the policy and, if so, instructs the firewall code 302 to create a lower level firewall filter to permit the connection.

In general, the connect and listen attempts include any attempt to connect to, or be connected to by, an endpoint. To this end, as used herein, "connect" and/or "listen" attempts include, inter alia, send requests, receive requests, join requests, and update requests.

Listen and/or connect attempts by a computer 102 typically include parameters that will permit the interception module 500 to determine the application or services' needs. As an example, for both listen and connect attempts, a bind of a port is typically requested. The bind may be for a specific port or for a wildcard port if various ports may be utilized. A listen attempt will typically include the socket address at which the application or service wishes to receive a connection. In addition, an application ID and a user ID can be inferred from the context of the listen attempt. From this inferred information, the request for the particular socket may be evaluated against policy for the application and/or user, and the connection may or may not be permitted based upon that policy.

If a connect request is made, that connect request would include similar information to the listen request, and may also include an endpoint address. Again, this information may be used and evaluated against the policy so as to determine whether or not the connection may be made.

A general policy for the computer 102 may be formed within the firewall policy 314, to either allow or deny particular applications and services on the computer 102 to connect to the network. This general policy may be manually established on the computer 102 upon setting a user's settings for the computer 102, may be established by a network administrator, or may be set to default settings upon establishing a user's profile. If desired, the policies may be on a per-user basis. These general policies may be, for example, "do not let any application connect to the unsafe network 110 unless the interception module 500 has different policy." The general policies may be stored separate from or with the policies maintained by the interception module 500.

In accordance with one embodiment of the invention, the policies within the interception module 500 (and stored in the policy cache 612, for example) may be created and stored as a result of a request by a user and/or service/application. This request may be made, for example, automatically or via user interface upon installing a service or application on the computer, upon the initiation of a connection, or at another suitable time. The request may simply include simple parameters of the desired connection, such as "allow application X to connect to the Internet one time" or, as other nonlimiting examples, any of the requests described above with the description of the firewall aware application 306.

In accordance with one embodiment of the invention, the request by the user and/or application does not require rules for ports, protocols, or IP addresses to enable an application or service to traverse the firewall code 302 and/or the edge firewall 324. Instead, as described above, after a policy has been established, upon request of a connection by an application, the interception module 500 determines the needs of an application or service by evaluating the connect and listen attempts of the application or service.

Figure 6:
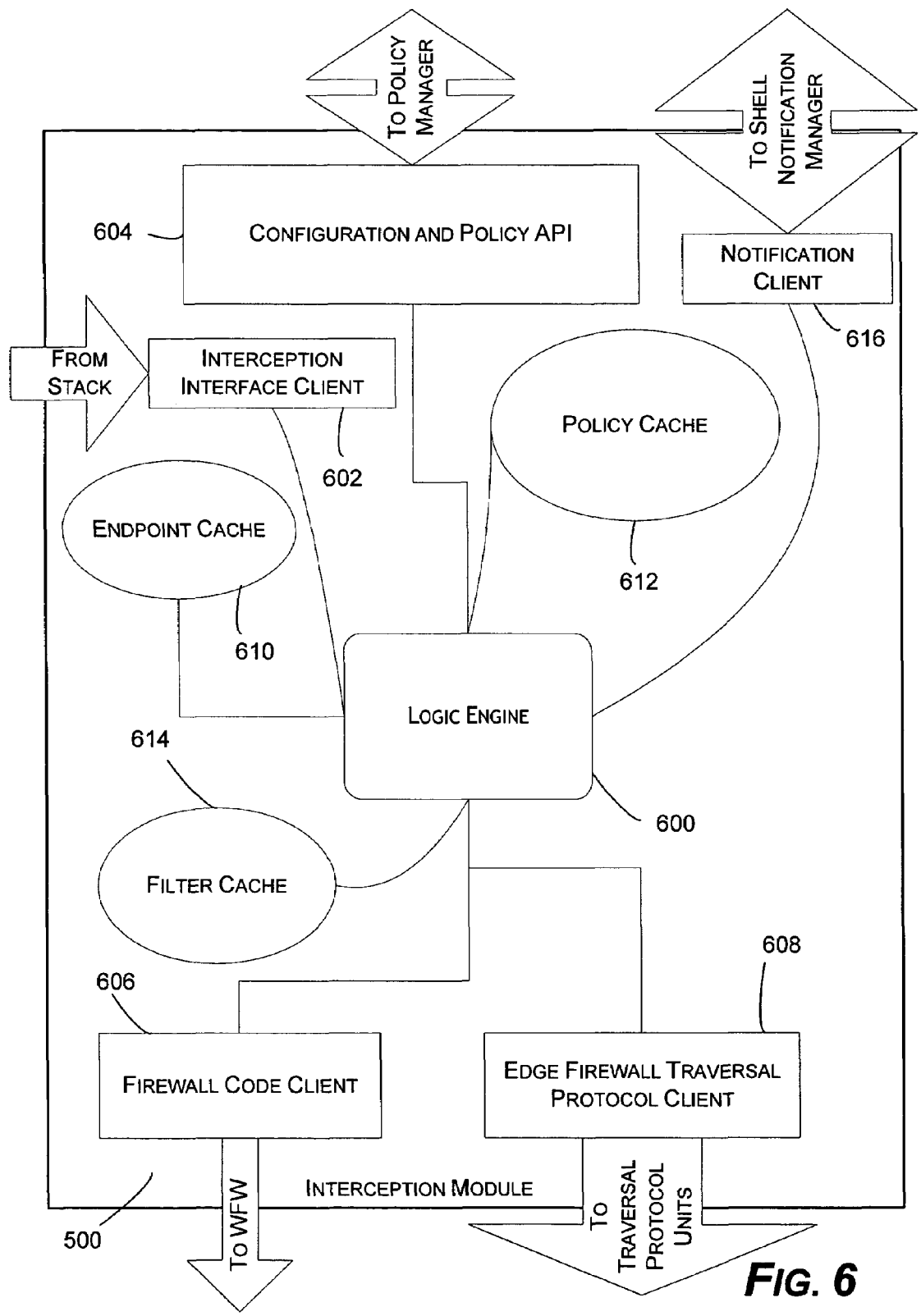
FIG. 6 shows a block diagram showing general components for the interception module of FIG. 5.

A block diagram showing general components for the interception module 500 is shown in FIG. 6. The interception module 500 includes a logic engine 600 that performs most of the basic operations of the interception module 500 described herein. An interception interface client 602 is connected to the logic engine 600, and is configured to interact with the network stack 508 and trap the connect and/or listen requests made by an application, such as the firewall unaware application 310. A configuration and policy API 604 is configured and arranged to communicate with the firewall policy 314 or an associated policy manager (not shown).

A local firewall client 606 is configured to communicate with the firewall code 302. A firewall traversal protocol client 608 is configured and arranged to communicate with the edge firewall 324.

In the example shown in FIG. 6, the interception module 500 includes an endpoint cache 610, a policy cache 612, and a filter cache 614. The endpoint cache 610 stores the operational state for the various endpoints (i.e., nodes) that the interception module 500 is currently managing. It is updated by the logic engine 600 based upon the inputs from the interception interface client 602. The policy cache 612 stores the policies that the interception module 500 is to enforce. Entries in the policy cache 612 may be associated with entries in the endpoint cache 610 (i.e., endpoints for which the given policy is being enforced). A single policy entry may be associated with multiple endpoints.

The interception interface client 602 handles the details of listen and/or connect attempts, and interacting with the network stack 508, and calls into the logic engine 600 to inform the logic engine 600 of intercepted actions and to receive authorization decisions. The configuration and policy API 604 is an external interface into the interception module 500. Requests may be made to the configuration and policy API 604 and will be stored in the policy cache 612. The policies may be provided, for example, by an application upon installation or an attempt to connect, via the firewall policy 314, or may be supplied by a user, for example via the socket API 312 (FIG. 3). Other examples are given below. The local firewall client 606 is utilized to instruct the firewall code 302 to create the appropriate filters. Similarly, the firewall traversal protocol client 608 is utilized to instruct the edge firewall 324 to construct appropriate filters, and thus performs much of the same function as the agent 320.

The filter cache 614 includes entries for the filters that the logic engine 600 has created. Entries in the filter cache 614 may be associated with entries in the endpoint cache 610 (e.g., the endpoints for which the filter has been created). A single filter may be associated with multiple endpoints. Information that may be included in the filter cache 614 includes the details of the filter (e.g., 5-tuple, associated IPSec policy, etc.), the handle for the corresponding firewall filter that will be used, and/or identifying information for the firewall traversal protocol client 608.

Turning now to operation of the interception module 500, prior to an application or service trying to establish a connection, a user and/or the application or service establishes policy for the application or service via the configuration and policy API 604. The policy is stored in the policy cache 612. After policy is established, the interception interface client 602 watches for connect and listen attempts by applications and services to the network stack 508 on the computer 102. The interception interface client 602 traps these attempts and sends them to the logic engine 600. The logic engine 600 determines what user is making the attempt, determines what application or service is making the attempt, and stores that information in the endpoint cache 610. The logic engine 600 then accesses the policy cache 612 to determine whether the user and application or service are allowed to connect to the requested network.

If both the user and application or service are allowed to connect to the network, the appropriate firewall configuration, such as a lower level firewall filter, is created to allow the application or service to have unfettered network communication. The firewall configuration is stored in the filter cache 614. The local firewall client 606 and the network traversal protocol client 608 may use this filer information to instruct the firewall code 302 and the edge firewall 324 to permit the connection to be established.

Figure 7:
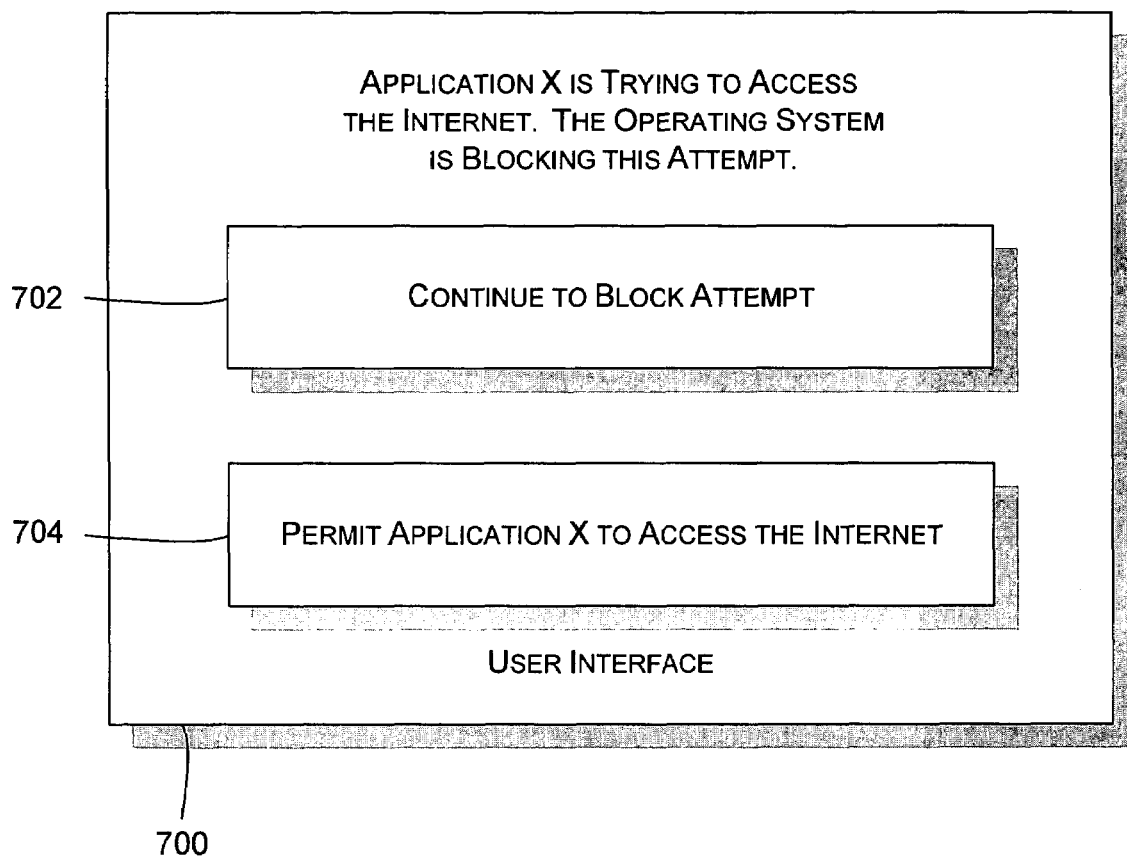
FIG. 7 shows a user interface that may be presented to a user upon a failed connection attempt in accordance with one embodiment of the invention.

In accordance with one embodiment of the invention, a notification client 616 is provided with the interception module 500. The notification client 616 is configured and arranged to communicate with a shell notification manager (not shown, but known in the art) or similar component so as to notify users of an event. For example, the notification client 616 may instruct the notification manager to notify a user that an application or service is attempting to access the Internet and that the operating system 300 is blocking this attempt, such as is shown by the user interface 700 in FIG. 7. In addition, the notification client 616 may instruct the notification manager to request the user's instructions regarding continuing to block or allow access, such as is permitted by the buttons 702 and 704 in FIG. 7. The notification client 616 may wait for and inform the logic engine 600 of the user's response to a query, if applicable.

If the user selects the button 704, permitting a connection, the selection of that button results in policy being established for that application (here, application X). If desired, the policy may permit only a one time connection, may permit connections in the future, or may permit connections within a time limit (e.g., within one day).

Figure 8:
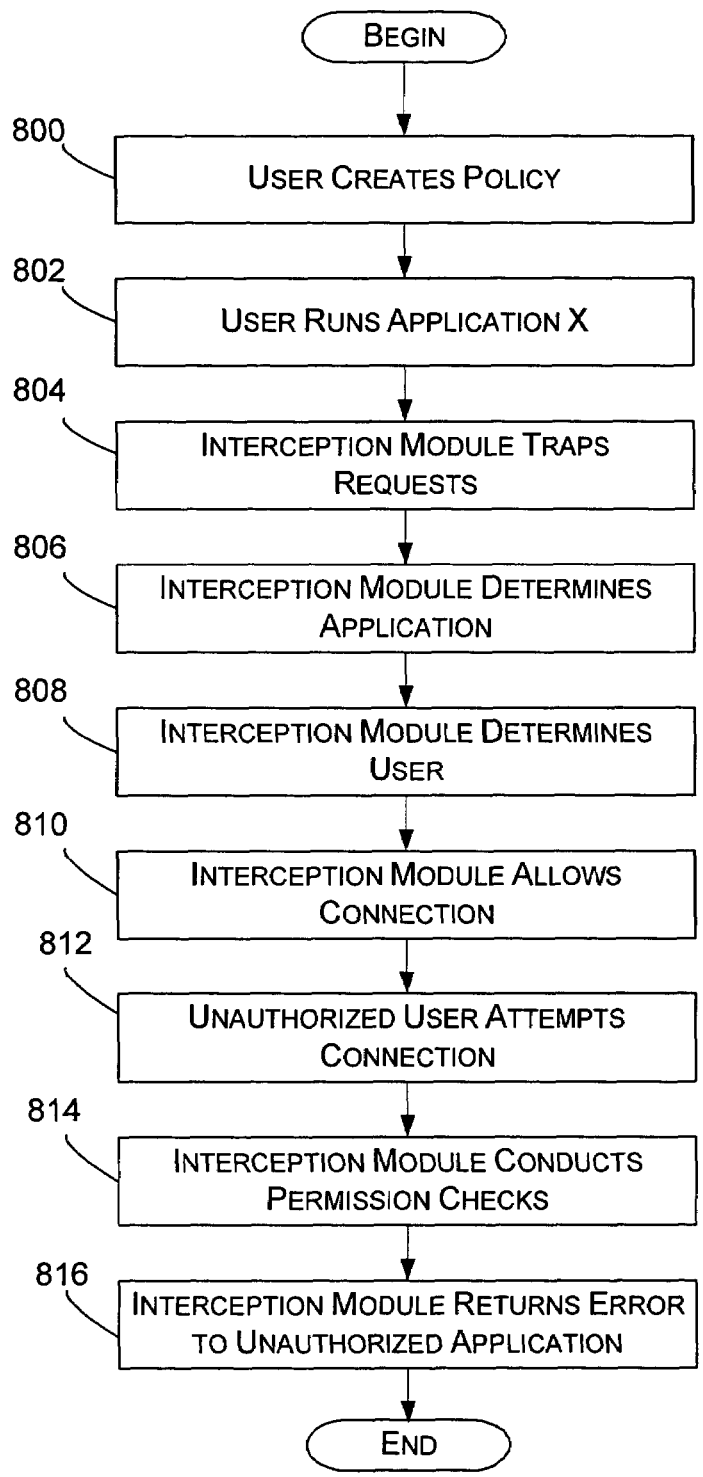
FIG. 8 is a flow diagram illustrating an example of how the interception module of FIG. 5 can allow a firewall unaware application to traverse through a firewall.

FIG. 8 shows an example of how the interception module 500 can allow a firewall unaware application 310 to traverse through a firewall, such as the firewall code 302 and/or the edge firewall 324. Beginning at step 800, a user creates policy to allow an application X to connect to a network, for example only when the user runs the application. The user later runs the application X at step 802. The application X attempts both connects and listens to the network stack 508. The interception module 500 traps these connect and listen attempts at step 804. The interception module 500 determines which application or service is making the request at step 806, and determines which user the application or service is running as in step 808.

Based upon this information, the interception module 500 determines that the user and application are allowed to connect to the network and automatically changes the firewall policy to allow listening on a local port and connection to the requested endpoint.

Because this user-specific policy is established only for the given user, a different user cannot access the network. For example, at step 812, second user runs application X, and at step 814 the interception module 500 does the necessary permission checks, similar to steps 806 and 808. At step 816, the interception module 500 determines that the second user is not allowed to run application X on the network and returns an error to the application, for example via the notification client 616.

Figure 9:
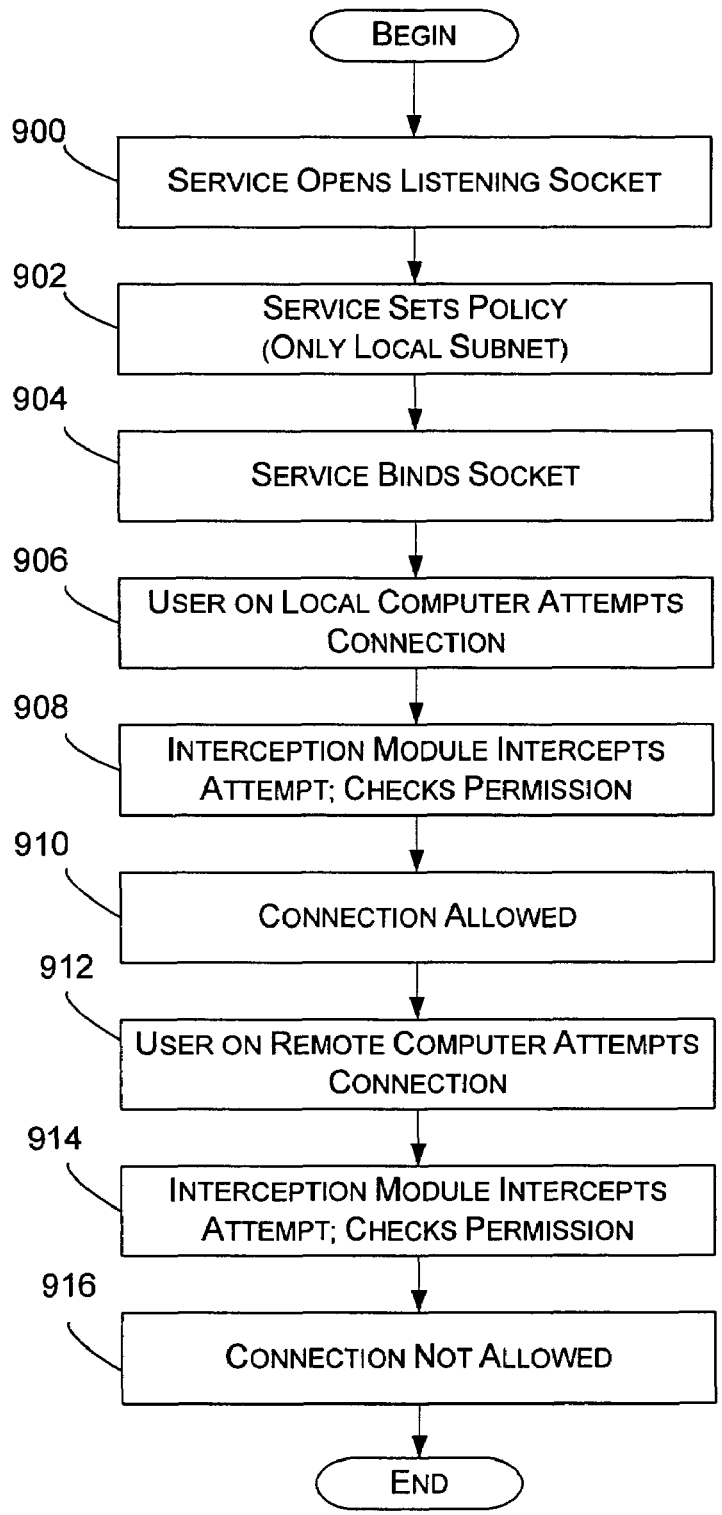
FIG. 9 is a flow diagram illustrating an example of how a service or application can inform a firewall code and/or the edge firewall of the service's networking needs.

FIG. 9 is a flow diagram generally showing steps of an example of how a service can inform the firewall code 302 and/or the edge firewall 324 of the service's networking needs. Beginning at step 900, a service on a computer, e.g., the computer 102 opens a listening socket. At step 902, the service uses an API, such as the socket API 312, to establish policy, for example to indicate that only inbound traffic from the local subnet (e.g., the safe network 104) should be accepted. At step 904, the service binds to the socket and awaits for connection attempts. At step 906, a user on a second computer, such as another computer 102 on the safe network 104, opens an application which attempts to connect to the service on the computer 102.

The interception module 500 on the computer 102 intercepts the connection attempt at step 908 and compares the subnet for the second computer against its own subnet. At step 910, the subnet check succeeds and the application on the second computer 102 connects to the service on the first computer 102.

The same policy established in step 902 may be used to reject a computer that is not from the local subnet, such as is shown in steps 912-916. At step 912, a user on a remote computer 108 opens an application which attempts to connect to the service on the first computer 102. At step 914, the firewall code 302 on the first computer 102 intercepts the connection attempt and compares the subnet for the remote computer 108 against its own subnet. At step 916, the subnet check fails and the application on the remote computer 108 is not allowed to connect to the service on the first computer 102.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method, comprising:

receiving, by an interception module communicating with a firewall via a first application programming interface, via a second application programming interface at least one policy established by a first user that permits at least one of an application and a service to connect to a network when the first user runs the at least one of the application and a service, wherein the at least one policy is stored among a plurality of policies in a policy cache of the interception module;

receiving, by the interception module a connect attempt, a listen attempt, or a combination thereof from the application or the service run by a second user;

extracting, by the interception module, user and application or service information from the connect attempt, the listen attempt, or the combination thereof;

determining, by the interception module, an identity of the second user and what application or what service is making the connect attempt, the listen attempt, or the combination thereof;

determining, by the interception module, whether the identity of the second user matches an identity of a user that established the at least one policy and whether the connect attempt, the listen attempt, or the combination thereof comply with the at least one policy; and when the connect attempt, the listen attempt, or the combination thereof comply with the at least one policy and the identity of the second user matches the identity of the user that established the at least one policy, instructing, by the interception module, the firewall to automatically create a configuration to allow the connect attempt, the listen attempt, or the combination thereof, and storing the configuration in a filter cache of the interception module.

2. The method of claim 1, further comprising sending a notification to a user of a connect attempt, a listen attempt, or a combination thereof.

3. The method of claim 2, wherein sending the notification comprises receiving a user input indicative of allowing a connection thereby creating at least one policy.

4. The method of claim 1, wherein establishing the at least one policy further comprises receiving a policy from the application or service.

5. The method of claim 4, wherein receiving the policy comprises receiving the policy via an application programming interface.

6. The method of claim 4, wherein the policy received from the application or service comprises inbound or outbound restrictions using one or more of Internet Protocol addresses, information about a subnet, information about scope of the connection, or combinations thereof.

7. The method of claim 4, wherein the policy received from the application or service comprises communication security level.

8. The method of claim 7, wherein the communication security level comprises authentication.

9. The method of claim 7, wherein the communication security level comprises encryption.

10. The method of claim 1, wherein the firewall comprises a host firewall located on a computer comprising the application or the service.

11. The method of claim 1 wherein the firewall comprises an edge firewall, and further comprising an agent to communicate information about the connection.

12. The method of claim 1, wherein the firewall comprises an edge firewall, and further comprising an authenticated protocol to communicate information to the edge firewall about the connection.

13. A computer-storage medium encoded with a computer program for performing the method recited in claim 11.

14. A computer system, comprising:

a firewall; and an interception module communicating with the firewall via a first application programming interface, the interception module including a second application programming interface for establishing, by a first user, at least one policy that permits at least one of an application and a service to connect to a network when the first user runs the at least one of the application and a service, wherein the at least one policy is stored in a policy cache of the interception module, the interception module is configured and adapted to:

intercept a request for a connect attempt, a listen attempt, or a combination thereof from the application or the service run by a second user;

extract user and application or service information from the connect attempt, the listen attempt, or the combination thereof;

identify the user and the application or the service from the user and application or service information;

determine whether an identity of the second user matches an identity of a user that established the at least one policy and whether the connect attempt, the listen attempt, or the combination thereof comply with the at least one policy; and when the connect attempt, the listen attempt, or the combination thereof comply with the at least one policy and the identity of the second user matches the identity of the user that established the at least one policy, instructing the firewall to create a configuration to allow the connect attempt, the listen attempt, or the combination thereof, and storing the configuration in a filter cache of the interception module.

15. The computer system of claim 14 wherein the interception module comprises a firewall client for communicating information about the connect attempt, the listen attempt, or the combination thereof to an edge firewall.

* * * * *